United States Patent

Morris

[15] 3,689,727
[45] Sept. 5, 1972

[54] INDUCTION COIL FOR HIGH FREQUENCY WELDING

[72] Inventor: Jack Morris, Orange, Conn.
[73] Assignee: Olin Corporation,
[22] Filed: March 30, 1971
[21] Appl. No.: 129,524

[52] U.S. Cl..............................219/10.79, 336/62
[51] Int. Cl................................................H05b 9/02
[58] Field of Search.............219/10.79; 336/62, 223

[56] References Cited

UNITED STATES PATENTS 3,603,760  9/1971  Krenou et al................219/79
1,936,309  11/1933  Northrup......................336/62
3,077,528  2/1963  Kennedy, Jr............219/10.79

Primary Examiner—J. V. Truhe
Assistant Examiner—Hugh D. Jaeger
Attorney—Paul Weinstein, Robert H. Bachman and Gordon G. Menzies

[57] ABSTRACT

An induction coil and a welding apparatus employing same having at least two helically wound turns of metal tubing, the turns of metal tubing being in close proximity to each other and to lead means, and a facing means for providing a substantially planar surface affixed to a face of at least one of the turns.

7 Claims, 8 Drawing Figures

JACK MORRIS
INVENTOR

JACK MORRIS
INVENTOR

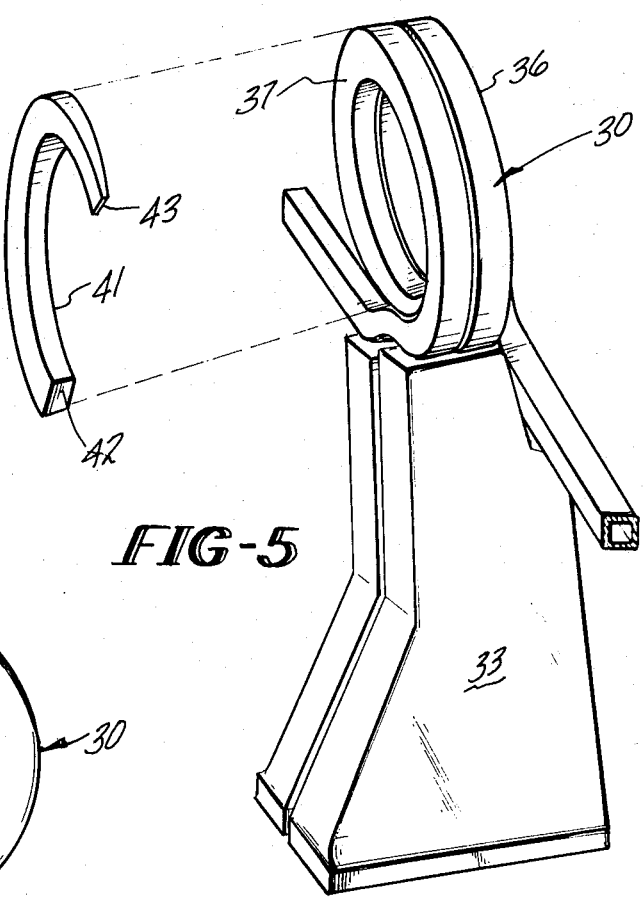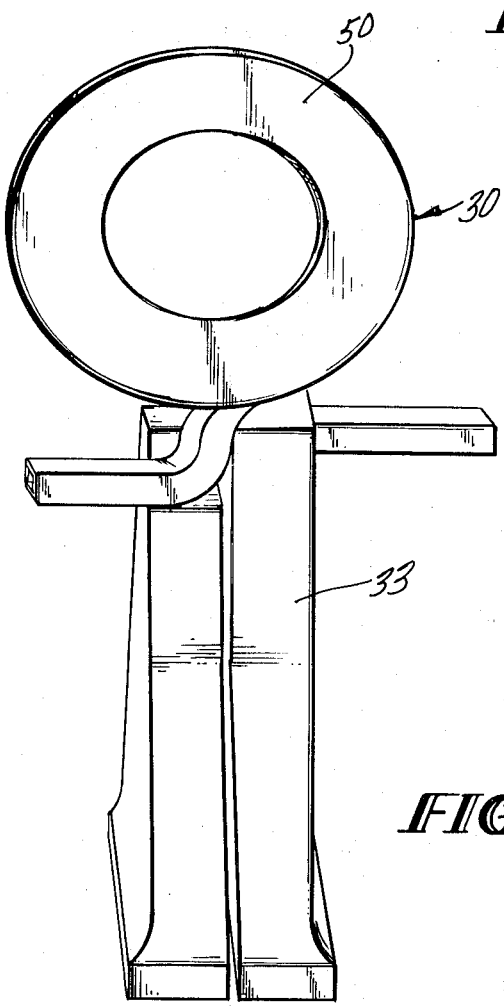

INDUCTION COIL FOR HIGH FREQUENCY WELDING

BACKGROUND OF THE INVENTION

In the art of welding metal strip into tubing, it is known to use high frequency induction welding. A typical example of a prior art welding apparatus and process is set out in U.S. Pat. No. 3,037,105, granted May 29, 1962.

A key element in the apparatus is the coil employed for inducing the current into the strip. When welding metals such as aluminum or steel, coils known in the art are usually adequate. However, when one attempts to weld copper or copper base alloys, greater difficulties are encountered because of the high conductivity of the copper or copper alloy. Therefore, it is necessary to maximize the efficiency and power output of the induction coil.

SUMMARY OF THE INVENTION

In accordance with this invention, an induction coil having at least two turns is employed. The coil is formed of metal tubing having any desired cross section. The turns of the coil are helically wound in close proximity to each other and in very close proximity to lead blocks to which the coil is attached.

Since a helically wound coil does not present a planar face transverse to the longitudinal axis of the tubing, in accordance with this invention, facing means for providing a planar surface is affixed to a face of at least one of the turns.

It is accordingly an object of this invention to provide an induction coil having improved efficiency for inducing a high frequency current to flow along the edges of a work piece wherein the edges are to be welded together.

It is a further object of this invention to provide an induction coil having at least two turns in series formed of a helically wound tubing with a facing means for providing a planar surface transverse to the longitudinal axis of the tubing being welded.

It is a further object of this invention to provide an induction coil as above wherein the coil has a flat oval shape.

It is a further object of this invention to provide an apparatus for welding together the opposed edges of a longitudinal gap in open metal tubing which includes an induction coil as above.

Other objects and advantages will become apparent from the following description and drawings.

BRIEF DESCRIPTION OF THE DRAWINGS

FIG. 5 shows an exploded perspective view of the induction coil of this invention.

FIG. 6 shows an induction coil in accordance with this invention wherein the helically wound turns of the coil have been surrounded by an insulating, encapsulating material.

DESCRIPTION OF THE PREFERRED EMBODIMENTS

Figures 1, 3:
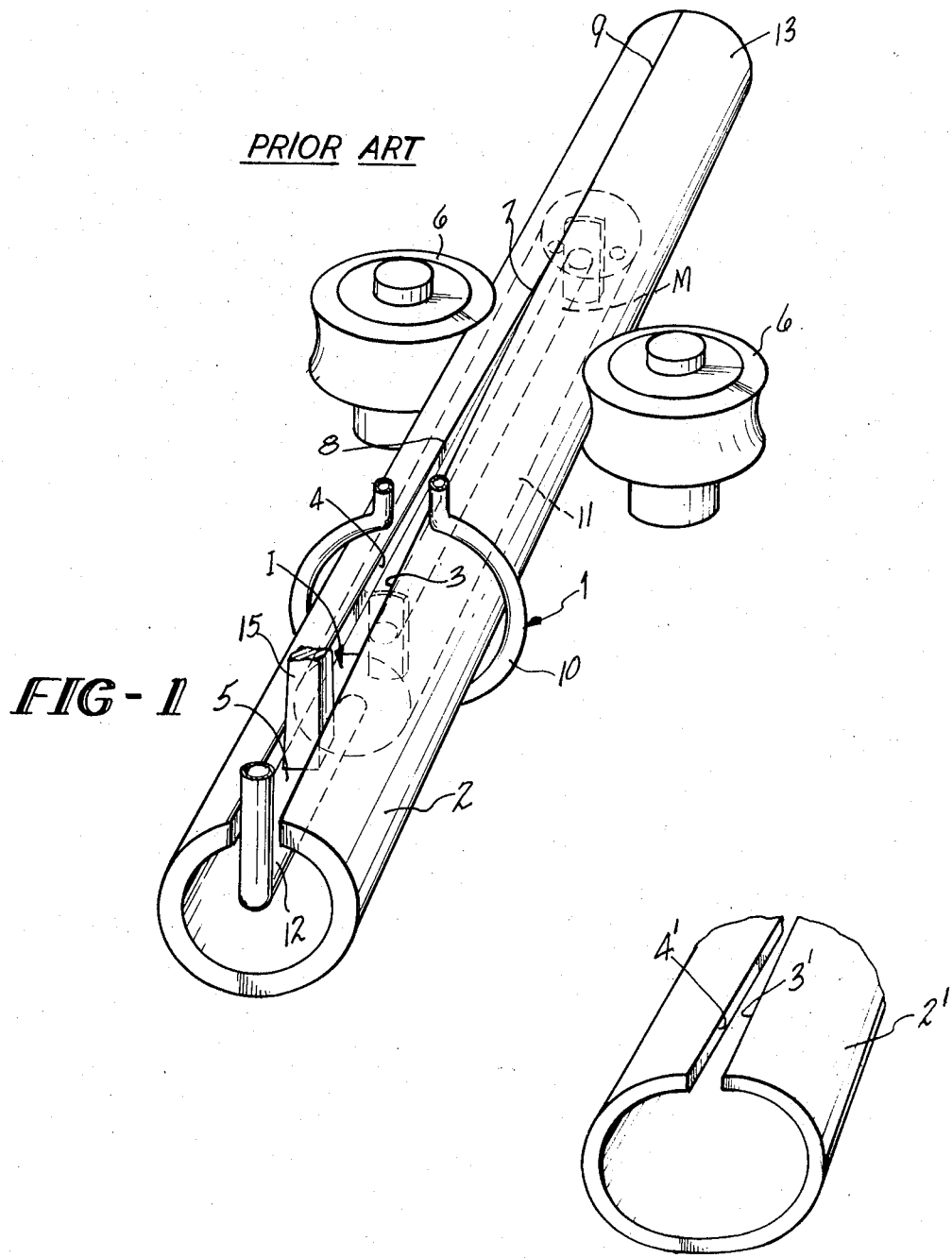
FIG. 1 is a schematic view of a typical prior art high frequency welding apparatus in which the coil of this invention may be employed.
FIG. 3 shows a perspective view of a preformed open tube in accordance with this invention.

Referring now to the drawings and especially to FIG. 1, there is illustrated a typical welding apparatus 1 for welding metal strip in the form of a preformed open tube 2 into tubing. The apparatus is adapted to weld together the opposed edges 3 and 4 which form the longitudinal gap 5 in the open metal tubing 2.

The open tube 2 is formed in a forming mill (not shown) situated in line immediately preceding the apparatus 1. The forming mill is of conventional well known designs. The forming mill may contain a plurality of roll stands or dies which form metal strip into the open tube 2. It is to be understood that other roll stands may be situated in line immediately following the apparatus 1 to further form the tubing such as, for example, to correct out of roundness. The roll stands are generally power driven and, therefore, provide means for rapidly and longitudinally advancing the tubing. Alternatively, this means may be power driven weld rolls 6 as shown.

The weld rolls 6 comprise a pair of pressure rollers of known form which engage opposite sides of the tube 2 and cause the longitudinally extending gap 5 therein to become closed substantially at a weld point 7 forming a V-shaped gap 8. As the open tubing 2 advances to the weld point 7, the edges 3 and 4 at the gap 8 become welded together along the weld seam 9.

The edges 3 and 4 at the V-shaped gap 8 are heated by means of an induction coil 10. The induction coil 10 shown is a single turn coil; however, a multiturn coil as in FIG. 2 and in accordance with this invention as in FIG. 4 could be substituted for the single turn coil.

The coil 10 is formed of wrought metal tubing. The coil is electrically connected to a source of high frequency current, not shown. The high frequency current is normally at least 10 kilocycles per second and, preferably, at least 100 kilocycles per second or higher. The coil is also connected to a source of cooling medium ( not shown) which flows through the tubing to keep it from overheating.

The apparatus 1 may also include the following elements as shown in FIG. 1. An impeder I may be included to improve the efficiency of the induction coil 10 by increasing the impedance of the high frequency current paths around the back of the open tube 2. This reduces the flow of current around the back of the tube 2 and increases the flow of current along the tube edges 3 and 4 running from a point on the tube edge 3 adjacent the coil 10 to the weld point 7 and back the opposing tube edge 4 to a point adjacent the coil 10. This results in more efficient heating of the edges 3 and 4 of the open tube 2, the edges being heated up to the welding temperature upon reaching the weld point 7.

The impeder I may be of any suitably known construction and comprises a schroud 11 connected to a hollow supporting arm 12 as shown extending down through the gap 8. The actual shape of the schroud 11 shown in FIG. 1 is merely schematic and it may have any suitable shape.

A source of cooling medium (not shown) such as water is connected to the hollow supporting arm 12 for flowing water into the schroud 11 and about a core of magnetic material M which is held therein. The magnetic material in the core should be of an insulating nature to provide a core substantially free of eddy current losses. The core is preferably a sintered magnetic oxide insulating material, preferably of types now well known which have a low loss factor and high volume resistivity. A suitable material is marketed under the name Ferramic by General Ceramic and Steatite Corporation, the permiability thereof being substantially greater than unity. The cooling medium which passes through the hollow supporting arm 12 flows within the schroud 11 and about the Ferramic core M to cool the core and is generally discharged within the welded tube 13.

Further, since the angle of the V-shaped gap 8 is important, a seam guide means 15 is generally included at a point in advance of the induction coil 10 to accurately space apart the edges of the tube 2 and, thereby, obtain the desired angle. The seam guide means may be formed of a suitable insulating material protruding down into the gap so that the roll stand preceding that position (not shown) will cause the tube gap edges 3 and 4 to be pressed against the opposite sides of the seam guide 15 whereby the edges are maintained with a uniform separation.

Figure 2A:
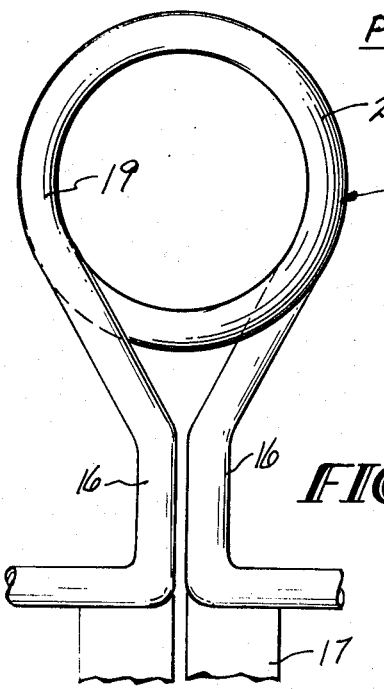
FIG. 2 shows front and side views of a typically helically wound tubular induction coil of the prior art.
Figure 2B:
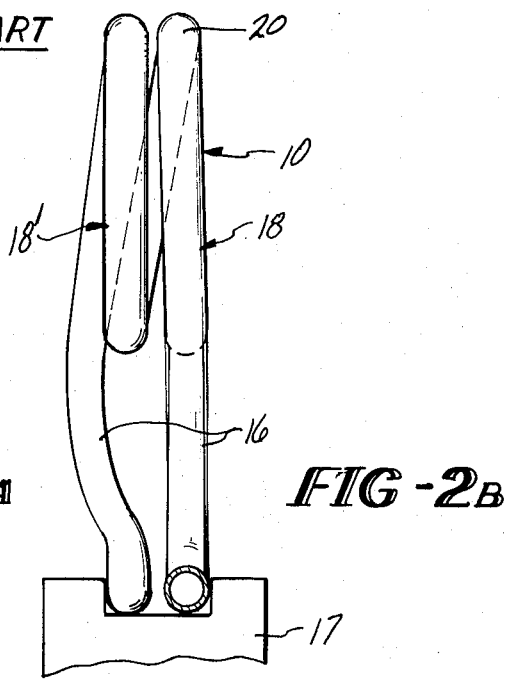

The induction coil 10 shown in FIG. 1 is a single turn coil; however, a multiturn coil 10' as in FIGS. 2A and 2B is also known and could be substituted for it. The single turn coil 10 of FIG. 1 is merely illustrative of the location of the coil. The coil of FIG. 2 is formed of metal tubing wound in a helical fashion. The terminal portions 16 of the coil are attached to lead blocks 17 which are adapted to be connected to a source of alternating high frequency current, not shown.

The following problems arise with the use of the two turn coil 10' of FIGS. 2A and 2B.

Since, as shown in FIG. 2B, the faces 18 and 18' of the coil are not planar because it is wound in a helical fashion, the induced currents on opposite edges 3 and 4 of the open tube 2 are not equal, which results in an uneven heating of the tube edges and a resultant uneven solidification in the weld seam 9. The uneven solidification comes about because the metal is hotter at one edge 3 or 4 than the other so that solidification does not proceed equally from each strip edge 3 and 4. This uneven solidification yields poor quality weld.

Further, the coil of FIGS. 2A and 2B is not very efficient for use in the welding of copper or copper base alloys. The lack of efficiency results from several factors. First, the inside surface 19 of the coil 10' is circular whereas the tubing in accordance with this invention as it passes to the weld rolls and within the coil preferably has a flat oval cross section as shown in FIG. 3. Tubing 2' with a flat oval cross section provides for better alignment of the strip edges 3' and 4' as compared to the circular cross section tubing 2 of FIG. 1. The circular ID of the prior art coil does not allow for the closest coupling of the coil to the tube 2', in accordance with this invention, which has a flat oval shape as it is being welded.

Further, the terminal portions 16 of the coil 10' which extend from the lead blocks 17 to the coil turns 20 are unnecessarily long and when bent as shown in FIG. 1 result in increased impedance in the terminal portions 16 because of the lack of proximity between the individual terminal portions. The long terminal portions 16 and their lack of proximity create high electrical losses and poor efficiency.

A further loss of efficiency results from the lack of close proximity between the turns 20 of the coil 10'.

Figure 4A:
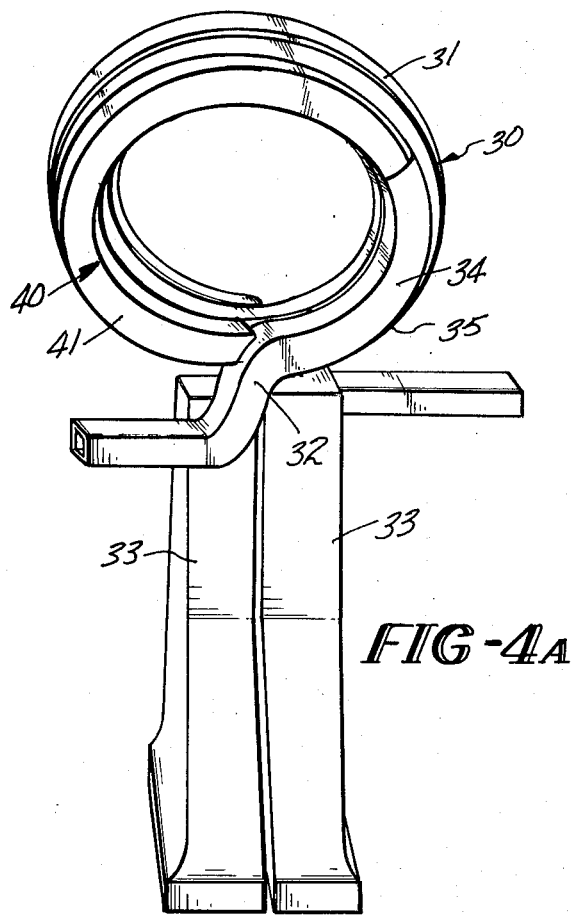
FIG. 4 shows front and side perspective views of the induction coil in accordance with this invention.
Figure 4B:
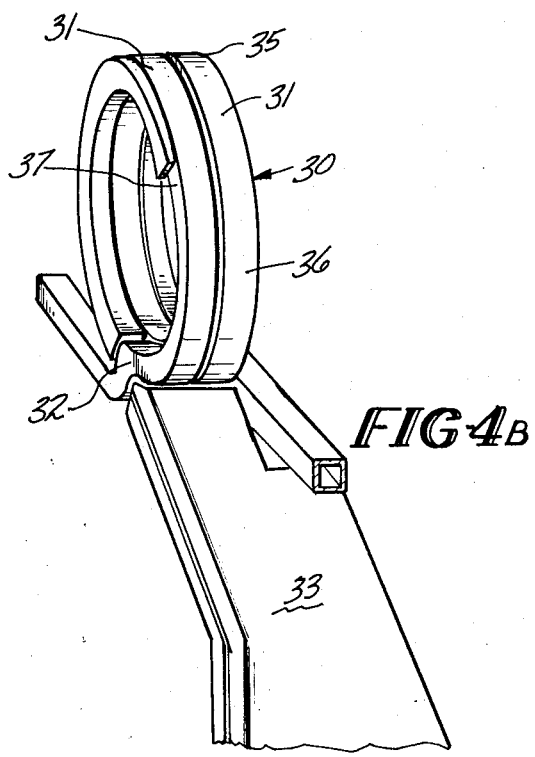

To eliminate the problems described with reference to the prior art coil 10', and thereby improve its efficiency and reduce the uneven heating at the weld point a coil 30 has been designed in accordance with this invention as shown in FIGS. 4A and 4B.

The coil 30 of this invention comprises at least two turns 31 of wrought metal tubing wound in a helical fashion as in the prior art coil 10'. The coil 30 may include any desired number of turns 31; however, two is preferred. The turns 31 of the coil 30 are wound in very close proximity so that they almost touch each other. Further, the terminal portions 32 of the coil 30 which are attached to lead blocks 33 are very short so that the turns 31 of the coil are in very close proximity to the lead blocks. The close proximity of the turns 31 of the coil 30 to each other and to the lead blocks 33 substantially reduces impedance losses due to the coil turns 31 and terminal portions 32.

The coil 30 shown in FIG. 4 is wound of tubing having a polygonal cross section, specifically, a substantially square cross section. The flat faces 34 of the tubing make it easier to fabricate a coil 30 wherein the turns 31 are in very close proximity.

In some applications, however, at extreme power levels, the use of the polygonal tubing is undesirable because of undue concentration of current at the corners 35 of the tubing which result in a concentration of heat and increased tendency to burn out. Therefore, in accordance with this invention, one can employ wrought metal tubing of a circular cross section. The particular cross section of the tubing is not critical and may be circular or polygonal as desired, the particular cross section of the tubing employed forming no part of the invention herein and being conventional in the art.

To present a planar face 36 or 37, transverse to the longitudinal axis of the open tube 2' so as to obtain even heating on both sides 3' and 4' of the weld zone, a facing means 40 comprising a filler block 41 is affixed to one or both faces 36 and 37 of the coil 30. Preferably, a filler block is affixed to the face 37 of the coil 30 which will be closest to the weld rolls 6; which face 37 will hereinafter be referred to as the leading face.

The filler block 41 may be affixed to the face 36 or 37 of the coil 30 in any desired manner but, preferably, it is brazed to the tubing turns 31 and is made of the same material as the tubing turn, normally, copper or a copper base alloy.

As shown in FIG. 3, the preformed open tubing 2' in accordance with this invention preferably has a flat oval cross section as it passes within the coil 30. Therefore, the coil 30 in accordance with this invention preferably has a flat oval shape corresponding to the flat oval shape of the open tube 2'. The weld seam 9 lies in the plane of the minor axis of the flat oval.

The use of polygonal tubing makes it easier to form the filler block 41 because of the flat surface 34 of the tubing. However, a filler block 41 can also be used with circular tubing, it being machined to conform to the circular form of the tubing.

FIG. 5 shows an exploded perspective view of the coil 30 in accordance with this invention with the filler block 41 removed. As shown therein, the filler block 41 is a substantially C-shaped member which tapers from one end 42 to the other end 43 so that when it is affixed to the helically wound face 36 or 37 of the coil 30 a planar face results.

In order to make the coil 30 more rugged and less susceptable to damage and burn out, the turns 31 of the coil may be surrounded by an encapsulating medium 50 as in FIG. 6. The encapsulating medium 50 may be a filled epoxy or a glass or other ceramic or the like as are well known in the art. The encapsulant 50 must be insulating or else the coil turns 31 will short out. In addition to making the coil 30 more rugged, the encapsulant flows between the turns 31 of the coil and prevents them from shorting out by contacting each other. This is very important in view of the very narrow spacing between the turns 31 of the coil 30.

If desired, an insulating spacer such as a thin sheet of Teflon (not shown) may be used between the turns 31 of the coil 30 instead of depending on the encapsulating medium. This provides the most preferred way of insulating the coil turns from each other.

In summary, the coil 30 of this invention provides a substantial improvement in efficiency of power output over the coils 10 and 10' formed of wrought metal tubing heretofore known by reducing the impedence of the coil turns 31 and the terminal portions 32. Further, by virtue of the planar face 36 or 37 presented by the coil 30 transverse to the longitudinal axis of the open tube 2', there is a symmetrical coupling between the coil and the tube and the heat generated at both edges 3' and 4' of the tube is substantially the same and the pool of molten metal solidifies along the central line of the weld seam 9 yielding welds of very high quality.

These are particularly significant improvements when welding low resistivity metals such as copper and copper base alloys and metals and alloys which have a small temperature gap between their solidus and liquidus points, for it is with these metals and alloys that the problems previously discussed are greatest.

While the invention has been described with reference to the welding of tubing, the coil is also useful in welding strips of metal or the like together. Further, while the tubing has been shown being butt welded together, other weld structures are well known in the art and could be used.

It is to be understood that this invention is not limited to the illustrations described and shown herein, which are deemed to be merely illustrative of the best modes of carrying out the invention, and which are suitable of modification of form, size, arrangement of parts and details of operation. The invention rather is intended to encompass all such modifications which are within its spirit and scope as defined by the claims.

What is claimed is:

1. In an apparatus for welding together the opposed edges of open tubing, said apparatus including means for rapidly and longitudinally advancing the open tubing while applying transverse pressure to bring the opposed edges together substantially at a welding point and an induction coil having at least two helically wound turns of hollow metal tubing, the ends of the tubing terminating in terminal portions which are attached to lead means for connection to a source of welding current, the improvement wherein:
   said at least two turns of said coil are in close proximity to each other and to said lead means; and
   a facing means for providing a planar surface is affixed to at least one face of said coil.

2. In a welding apparatus as in claim 1 the improvement wherein said facing means comprises a filler block affixed to the leading face of said coil.

3. In a welding apparatus as in claim 2 the improvement wherein said coil is employed in an apparatus for welding copper or copper base alloys.

4. In a welding apparatus as in claim 2 the improvement wherein said at least two turns are separated by an insulating material.

5. In a welding apparatus as in claim 2 the improvement wherein said coil is surrounded by an insulating material whereby said insulating material encapsulates the turns of said coil.

6. In a welding apparatus as in claim 3 the further improvement wherein said welding current comprises an alternating high frequency current.

7. In a welding apparatus as in claim 6 the further improvement wherein said opposing edges are brought together at said welding point in a narrow V-shaped formation with its apex at the weld point.

* * * * *